US010360592B1

(12) United States Patent
Emigh et al.

(10) Patent No.: US 10,360,592 B1
(45) Date of Patent: Jul. 23, 2019

(54) REWARDS FOR PURCHASES

(75) Inventors: Aaron T. Emigh, Incline Village, NV (US); Navneet Loiwal, Palo Alto, CA (US); Cyriac Roeding, Portola Valley, CA (US); Jeffrey Todd Sellinger, Manhattan Beach, CA (US); Evan Tana, San Francisco, CA (US); Sze Ngai Tsai, Sunnyvale, CA (US); Moritz Winter, Palo Alto, CA (US)

(73) Assignee: shopkick, Inc., Redwood City, CA (US)

( * ) Notice: Subject to any disclaimer, the term of this patent is extended or adjusted under 35 U.S.C. 154(b) by 237 days.

(21) Appl. No.: 13/276,277

(22) Filed: Oct. 18, 2011

Related U.S. Application Data

(60) Provisional application No. 61/394,279, filed on Oct. 18, 2010.

(51) Int. Cl.
*G06Q 30/02* (2012.01)

(52) U.S. Cl.
CPC ..... *G06Q 30/0259* (2013.01); *G06Q 30/0207* (2013.01); *G06Q 30/0224* (2013.01); *G06Q 30/0226* (2013.01); *G06Q 30/0229* (2013.01); *G06Q 30/0261* (2013.01)

(58) Field of Classification Search
CPC .................................. G06Q 30/0207–30/0277
See application file for complete search history.

(56) References Cited

U.S. PATENT DOCUMENTS

| | | | | |
|---|---|---|---|---|
| 6,587,835 B1 * | 7/2003 | Treyz | ..................... | G06Q 20/12 705/14.64 |
| 8,489,452 B1 * | 7/2013 | Warner | .............. | G06Q 30/0226 705/14.34 |
| 2004/0002897 A1 * | 1/2004 | Vishik | .................... | G06Q 30/02 705/14.51 |
| 2004/0186768 A1 * | 9/2004 | Wakim | .................... | G06Q 30/02 705/14.27 |
| 2006/0091203 A1 * | 5/2006 | Bakker et al. | ................ | 235/381 |
| 2006/0206376 A1 * | 9/2006 | Gibbs | .................... | G06Q 30/02 705/14.13 |
| 2007/0038516 A1 * | 2/2007 | Apple | .................... | G06O 30/02 705/14.42 |
| 2008/0040219 A1 * | 2/2008 | Kim | ........................ | G06Q 30/02 705/14.26 |
| 2008/0059297 A1 * | 3/2008 | Vallier | .................... | G06Q 30/02 705/14.27 |
| 2008/0077486 A1 * | 3/2008 | Davis et al. | .................... | 705/14 |
| 2008/0208642 A1 * | 8/2008 | Koplar | .................... | G06Q 10/02 705/5 |

(Continued)

OTHER PUBLICATIONS

A Survey of Mobile Phone Sensing, Lane et al., IEEE Communications Magazine • Sep. 2010.*

*Primary Examiner* — David J Stoltenberg
(74) *Attorney, Agent, or Firm* — Van Pelt, Yi & James LLP

(57) ABSTRACT

Providing rewards for purchases is disclosed. In some embodiments, electronic couponing data corresponding to an available reward offer for an item as well as an association of a loyalty identifier with the reward offer is provided to an electronic coupon processor; and in response to receiving an indication from the electronic coupon processor that the loyalty identifier was associated with a transaction in which the item was purchased, a user account is credited with a reward amount associated with the reward offer.

36 Claims, 5 Drawing Sheets

(56) References Cited

U.S. PATENT DOCUMENTS

| | | | | |
|---|---|---|---|---|
| 2008/0262928 | A1* | 10/2008 | Michaelis | G06Q 30/02 705/14.26 |
| 2009/0048926 | A1* | 2/2009 | Salesky | G06Q 20/10 705/14.13 |
| 2009/0061884 | A1* | 3/2009 | Rajan | G06Q 30/0225 455/445 |
| 2009/0076912 | A1* | 3/2009 | Rajan | G06Q 30/0267 705/14.64 |
| 2009/0131080 | A1* | 5/2009 | Nadler | G06Q 30/02 455/456.3 |
| 2009/0182597 | A1* | 7/2009 | Bull | G06Q 30/02 705/14.1 |
| 2010/0014869 | A1* | 1/2010 | Koplar | G06Q 10/02 398/118 |
| 2010/0023401 | A1* | 1/2010 | Ariyibi | G06Q 30/02 705/14.58 |
| 2010/0125495 | A1* | 5/2010 | Smith | G06Q 20/3223 705/14.23 |
| 2010/0145784 | A1* | 6/2010 | Sriver | G01C 21/20 705/14.25 |
| 2010/0174598 | A1* | 7/2010 | Khan et al. | 705/14.32 |
| 2010/0274625 | A1* | 10/2010 | Carlson | G06Q 20/202 705/14.3 |
| 2011/0022424 | A1* | 1/2011 | VonDerheide | G01C 21/20 705/5 |
| 2011/0028160 | A1* | 2/2011 | Roeding | G06Q 30/00 455/456.1 |
| 2011/0029359 | A1* | 2/2011 | Roeding | G06Q 30/00 705/14.1 |
| 2011/0029362 | A1* | 2/2011 | Roeding | G06Q 30/00 705/14.13 |
| 2011/0029363 | A1* | 2/2011 | Gillenson | G06Q 30/0222 705/14.15 |
| 2011/0055005 | A1* | 3/2011 | Lang | G06Q 30/02 705/14.45 |
| 2011/0060652 | A1* | 3/2011 | Morton | H04W 4/043 705/14.58 |
| 2011/0238514 | A1* | 9/2011 | Ramalingam | H04W 4/029 705/21 |
| 2011/0276377 | A1* | 11/2011 | Kim | G06Q 30/02 705/14.17 |
| 2012/0089450 | A1* | 4/2012 | Anantha | G06Q 30/0207 705/14.23 |

* cited by examiner

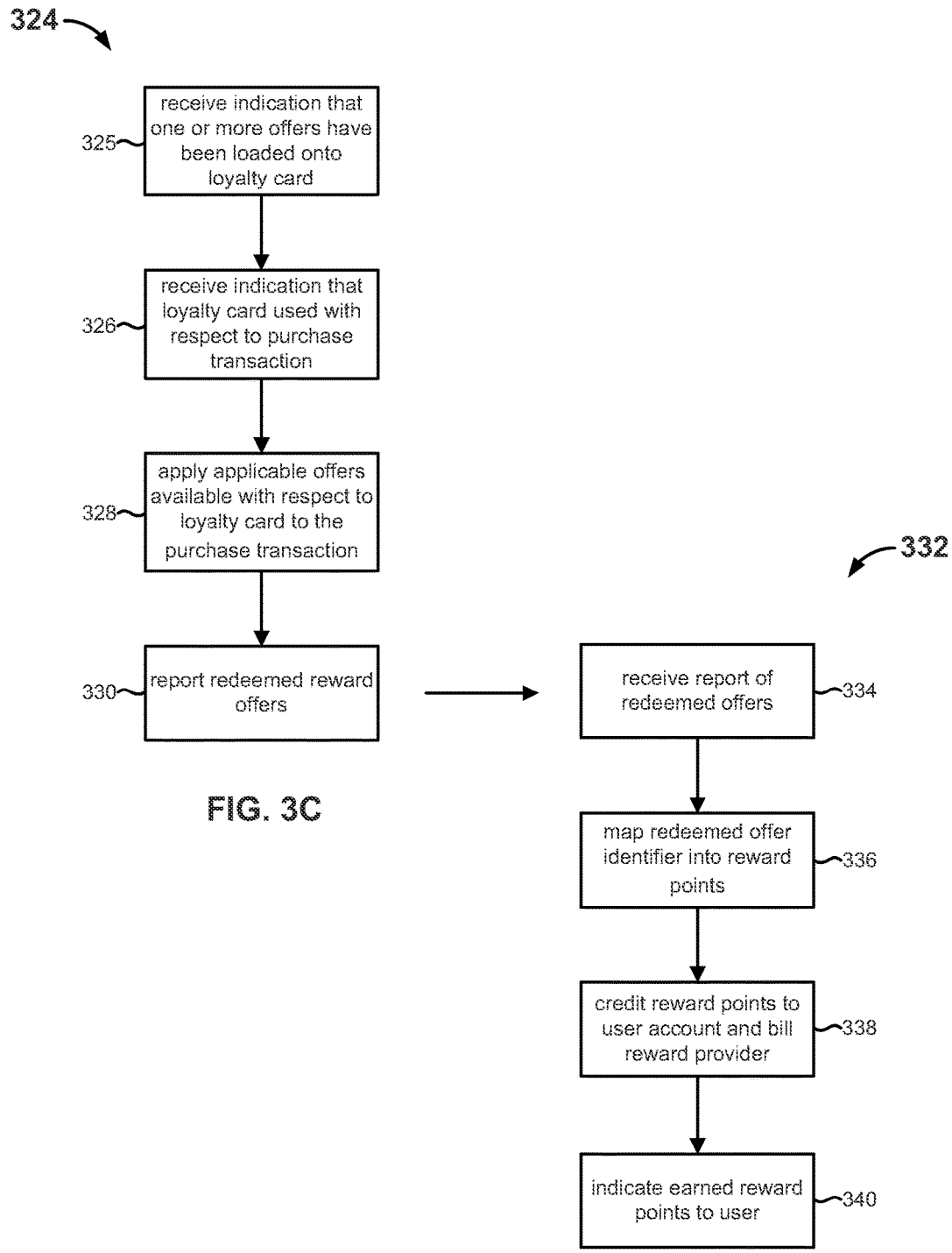

400 ↘

| offer ID | image | store ID | trigger item(s) | description | reward amt | expiration | freq cap |

| user ID | store ID | card ID |

| card ID | offer ID |

FIG. 4C

REWARDS FOR PURCHASES

CROSS REFERENCE TO OTHER APPLICATIONS

This application claims priority to U.S. Provisional Patent Application No. 61/394,279 entitled REWARDS FOR PURCHASES filed Oct. 18, 2010 which is incorporated herein by reference for all purposes.

BACKGROUND OF THE INVENTION

Existing loyalty cards typically provide electronic coupons that discount certain items and/or services by prescribed amounts when purchased. However, discounting is not favored by most retailers and brands because discounting erodes both the value of a brand as well as top line revenues. Thus, different techniques for rewarding a customer for the purchases of items and/or services would be useful.

BRIEF DESCRIPTION OF THE DRAWINGS

Various embodiments of the invention are disclosed in the following detailed description and the accompanying drawings.

FIG. 3C is a flow chart illustrating an embodiment of a process for reporting redeemed reward offers to a rewards service FIG. 3D is a flow chart illustrating an embodiment of a process for translating redeemed reward offers into reward points.

FIG. 4A illustrates an embodiment of a data structure for storing information associated with a reward offer.

FIG. 4B illustrates an embodiment of a data structure for storing information associated with a user loyalty card.

FIG. 4C illustrates an embodiment of a data structure for storing information associated with a redeemed offer.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
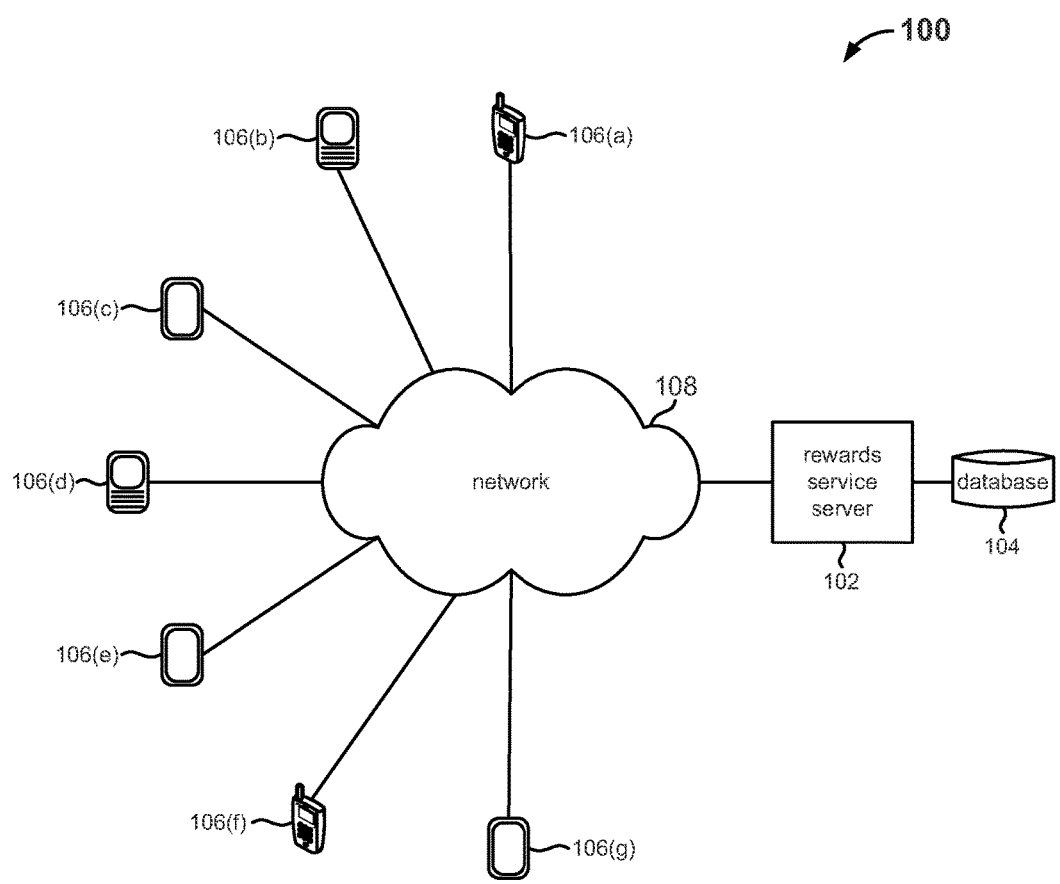
FIG. 1 is a block diagram illustrating an embodiment of a network environment in which a rewards service is provided.

FIG. 1 is a block diagram illustrating an embodiment of a network environment 100 in which a rewards service is provided. As further described herein, the rewards service offers users rewards for the purchases of certain goods and/or services. In some embodiments, the rewards service comprises a mobile application and/or a server application. As one example, the rewards service may comprise a mobile application which communicates with a server application. As another example, the rewards service may comprise a web application, which in some embodiments may communicate with mobile devices via SMS or push notifications.

In the given example, the rewards service is developed, distributed, and/or managed by the entity comprising server 102. Although depicted as a single block in FIG. 1, rewards service server 102 may comprise any number of possibly networked components. For example, server 102 may be a part of a server farm. Information associated with the offers and users of the rewards service is stored in one or more databases such as database 104.

The rewards service is installed on and available to users of each of a plurality of devices 106. For example, a rewards service application may be downloaded from server 102 and installed on each of devices 106. In FIG. 1, devices 106 are depicted as cellular or mobile phones. However, a device 106 may comprise any other computing device that is capable of communicating with server 102, such as a personal or enterprise digital assistant, tablet computer, notebook computer, etc.

As depicted, communication between server 102 and devices 106 is facilitated by network 108. In various embodiments, network 108 may comprise any combination of one or more public, private, wired, and/or wireless networks, such as a cellular network or the Internet. Example communications between server 102 and devices 106 may include, for example, the download of a client-side application from server 102, or from an application repository such as the Apple App Store or the Android Market, at a device 106; the communication of user selections and/or information from a device 106 to server 102, some of which may be indexed and stored in database 104; the provision of reward offers by server 102 to a device 106 for display at and consideration by a user of the device; an indication by server 102 of available reward points or rewards to a user of a device 106; redemption of an available reward by a user of a device 106; etc.

In some embodiments, the disclosed rewards service is provided via a loyalty or rewards card associated with a store or service. In such cases, easy implementation of the rewards service is facilitated by utilizing existing integration of loyalty cards into point of sale systems. That is, the disclosed rewards service may be integrated with an existing rewards or loyalty program of a store or service and award a user points for purchases of qualifying products or services on top of (or, in some embodiments, in lieu of) any offers the user may qualify for from the loyalty program. In some embodiments, a user selects and/or loads offers associated with one or more items for which points are available onto a loyalty card of a store at which the items are to be purchased so that points associated with corresponding offers can be credited to a user account in response to actual purchases. In some embodiments, reward offers are represented with respect to a loyalty card as digital or electronic coupons having nominal values (e.g., $0 or values less than $0.10 such as $0.01). In such cases, no or nominal deductions are made during an actual purchase, but points are credited to a corresponding user account in response to the purchase.

Figure 2:
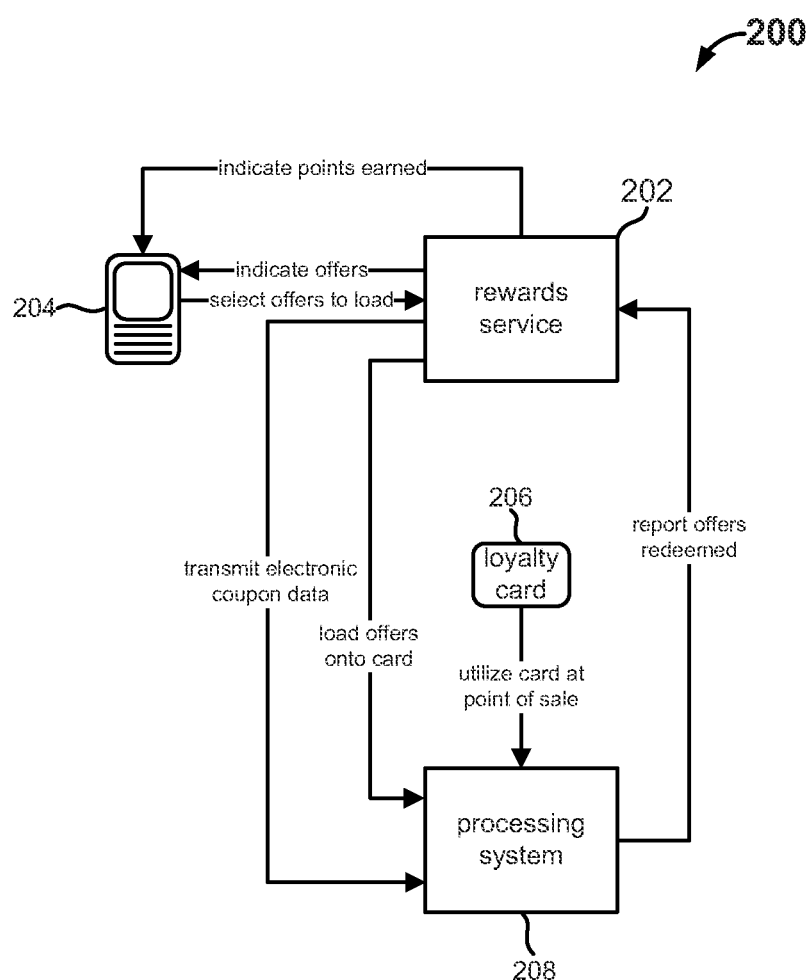
FIG. 2 is a block diagram illustrating an embodiment of a rewards service.

FIG. 2 is a block diagram 200 illustrating an embodiment of a rewards service. Specifically, block diagram 200 shows various components involved in rewarding a user points for purchases via the rewards service disclosed herein. As depicted, a user communicates with a rewards service 202 via mobile device 204. For example, rewards service 202 and mobile device 204 may comprise rewards service server 102 and mobile device 106, respectively, of FIG. 1. Information corresponding to a loyalty card 206 associated with a user, such as a loyalty card identifier and/or an associated store identifier, may be received from a user (e.g., via a mobile application at mobile device 204 or a web application provided by rewards service 202) and uploaded to and/or stored at rewards service 202, for example, in a database such as database 104 of FIG. 1.

An offer may be processed at rewards service 202 to create corresponding electronic couponing data, e.g. an electronic coupon, that includes data associated with the offer, which may be transmitted to processing system 208, which in some embodiments may be associated with an electronic coupon processor. Offers available for a user are provided by rewards service 202 and displayed by a client-side application of the rewards service at mobile device 204. In some embodiments (not shown), the information and user interaction described herein as occurring with mobile device 204 may occur in whole or in part on a web site wherein the web pages are provided by rewards service 202 and displayed in a web browser on a client computer, such as a desktop or laptop computer.

A user instruction to load one or more offers onto a loyalty card of a particular store or service is received and communicated by the client-side application to rewards service 202, which in turn loads the selected offers onto the user's loyalty card 206 by communicating with processing system 208, which in some embodiments may be associated with the loyalty system administrator for loyalty card 206 or a subcontractor thereof, and providing information relating to the offer (e.g., a unique identifier for the offer) and the identity of the user (e.g., the loyalty card identifier or other unique identifier for the user). In some embodiments, rather than receiving a user instruction to load an offer, an offer may be automatically loaded responsive to viewing the offer or all offers may be automatically loaded.

In response to utilization of loyalty card 206 at a point of sale, the processing system 208 configured to process offers associated with loyalty card 206 logs information associated with the purchase transaction, for example, as received from a point of sale system with optional intermediary services which may in some embodiments batch data together into periodic transfers, such as daily transfers, wherein each transfer comprises such purchase information for a period of time corresponding to the period of the transfer, and communicates the information to rewards service 202 so that an appropriate number of points (or any other appropriate reward denomination) can be credited to the user's rewards account based on the actual purchases at the point of sale. The points earned by the user for a given purchase transaction and/or cumulatively are communicated to mobile device 204 by rewards service 202, for example by SMS, push notification, and/or presentation in an application running on mobile device 204.

FIGS. 3A-3D are flow charts illustrating embodiments of processes associated with providing and earning rewards for purchases. In some embodiments, reward points earned for actual purchases are redeemable for rewards such as gift cards, travel vouchers, credits for services such as online games, donations to charities, etc. Different rewards may be redeemable for different numbers of reward points. Process 300 of FIG. 3A and process 332 of FIG. 3D may be employed, for example, by a rewards service, such as rewards service server 102 of FIG. 1 or rewards service 202 of FIG. 2. Process 302 of FIG. 3B may be employed, for example, by a device via which the rewards service is made available to a user, such as devices 106 of FIG. 1 or mobile device 204 of FIG. 2. That is, process 302 may be employed by a client-side rewards service application at a mobile device. Process 324 of FIG. 3C may be employed, for example, by an entity configured to process transactions relating to a loyalty card, such as an electronic couponing service such as processing system 208 of FIG. 2. As described above, in some embodiments, reward offers are represented as electronic coupons loaded onto a loyalty card that have no or nominal monetary value but are instead translated into a prescribed number of reward points that are granted to a user in response to actual purchases of items for which rewards are offered.

Figures 3A, 3B:
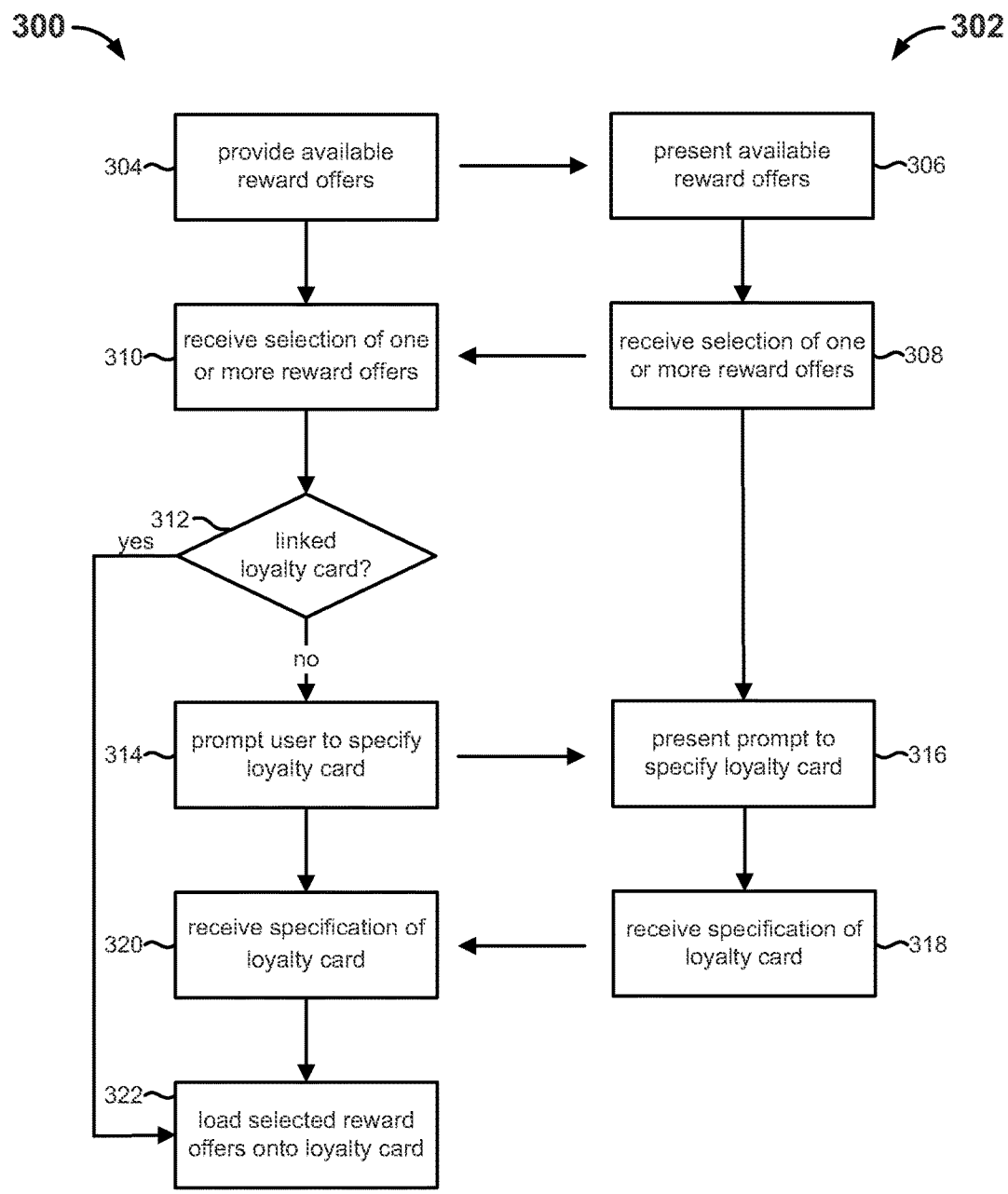
FIGS. 3A-3B are flow charts illustrating embodiments of processes for loading selected reward offers onto a loyalty card.

Process 300 of FIG. 3A and process 302 of FIG. 3B may be employed to select and load reward offers onto a loyalty card. Process 300 starts at step 304 at which reward offers available for a user are provided, and process 302 starts at step 306 at which the available reward offers are presented to the user. FIG. 4A illustrates an embodiment of a data structure 400 for storing information associated with a reward offer, for example, in a database of a rewards service such as database 104 of FIG. 1. In the given example, data structure 400 comprises fields for an offer identifier, an image associated with the offer, store identifier(s) indicating one or more stores at which the offer can be redeemed, one or more trigger items that may qualify for a reward when purchased, a description of the offer, a reward amount associated with the offer, an expiration date of the offer, and a frequency cap of the offer (e.g., an indication that the offer may not be redeemed more than a set number of times, such as once, in a set period, such as a week), but in other embodiments may comprise any other appropriate combination of information. Electronic feeds of offers may periodically be received from brand and/or retail partners and are input into the rewards service system. Reward offers may be specified or input into the rewards service system, i.e., database 104 of FIG. 1, via manual entry through an administrative interface or directly via an associated API (Application Program Interface) from a brand or store/retailer providing the offer. A reward offer presented at step 306 may include any offer information available in an associated database record such as the information included in data structure 400 of FIG. 4A, or a subset thereof, such as the image, description, reward amount, and expiration date.

Different reward offers may be made available for different users based upon factors such as purchase history, user preferences, demographic data, etc. Moreover, the reward offers provided and presented to the user may be based at least in part on indications by the user of the types of items and/or services in which the user is interested, presently interested, or inferred to potentially be interested in based on analysis of past behavior patterns, such as viewing and/or explicit or implicit preference indications such as "favoriting" or "liking". In some embodiments, the reward offers comprise offers for items or services that can be purchased at any of a plurality of stores. In some cases, for example, the reward offers may comprise offers for items or services available in a particular category of stores (e.g., grocery stores). Such a category may be selected or specified by the user. In some embodiments, the reward offers comprise offers for items or services that can be purchased at a particular store, for example, based on a known inventory of the store. Such a particular store of interest may be indicated by the user. In some cases, the reward offers may comprise offers for items or services available in one or more favorite stores of the user. In some embodiments, the reward offers comprise offers for items or services available at nearby stores, for example, based on a location of the user that has been automatically determined or specified by the user. In some such cases, the reward offers comprise offers for items or services available at a store in which a user is currently located, which may be automatically determined by detecting a presence of the user in the store or specified by the user. In some embodiments, a value of a reward (e.g., a number of reward points) is indicated with each reward offer presented to the user at step 306.

At step 308 of process 302 and step 310 of process 300, a selection of one or more reward offers is received. In various embodiments, the selection of steps 308 and 310 comprises a selection of all or a subset of reward offers provided and presented to the user at steps 304 and 306. In some embodiments, all available reward offers are automatically selected at steps 308 and 310, for example, that are applicable for a particular store or service. In other embodiments, the selected offers of steps 308 and 310 comprise only those offers that are explicitly selected by the user.

At step 312 of process 300, it is determined whether the selection of step 308 was linked with a loyalty card. (In practice, more than one store identifier may be involved at this step, in which case the subsequent steps are performed in sequence as described herein for each successive store identifier; for clarity in the discussion below, the process is discussed for a single store identifier.) One example of the selection being linked with a loyalty card is if the selection was made from within a view of a particular store, or has a single store identifier associated with every offer in the selection, and a loyalty card associated with that store has been associated with the account of the user, in which case the loyalty card is considered to be linked. If it is determined at step 312 that the selection of step 308 was not linked with a loyalty card, the user is prompted to specify a loyalty card at step 314, and the prompt to specify a loyalty card is presented to the user at step 316 of process 302. In some embodiments, for example in which more than one store identifier is associated with the selection and one or more loyalty cards associated with said store identifiers has previously been associated with the account of the user, the prompt to specify a loyalty card includes a list of one or more loyalty cards previously specified by the user and stored with respect to an account of the user in the rewards service system, e.g., in database 104 of FIG. 1.

FIG. 4B illustrates an embodiment of a data structure 402 for storing information associated with a user loyalty card, for example, in a database of a rewards service system such as database 104 of FIG. 1. In the given example, data structure 402 comprises fields for a user identifier, store identifier, and loyalty card identifier but in other embodiments may comprise any other appropriate combination of information that can be used to associate a user with a loyalty card.

In some cases, a user may be prompted to confirm loading of selected reward offers onto an automatically selected loyalty card at steps 314 and 316, wherein an applicable loyalty card is automatically determined, for example, based on the store associated with the selected offers and/or the current location of the user, which may be determined by automatically detecting a presence of the user in a store or from a user specification of the store. In some embodiments, the prompt to specify a loyalty card of steps 314 and 316 may include an option to update information associated with an existing loyalty card and/or add a new loyalty card.

At step 318 of process 302 and step 320 of process 300, a specification of a loyalty card on which to link the selected reward offers is received from the user. In some embodiments, the specified loyalty card is selected from a list of loyalty cards presented to the user or comprises an automatically selected applicable loyalty card as described above with respect to steps 314 and 316. In some embodiments, steps 318 and 320 include the specification of updated information associated with an existing loyalty card or information associated with a new loyalty card. In such cases, information such as the card identifier and/or store identifier may be manually entered and/or automatically determined. For example, card and/or store identifiers may be automatically extracted using OCR (Optical Character Recognition) techniques on an image or photograph of a card, which may be captured by a camera available in a user handset; or NFC (near field communication) capabilities of a user handset may be employed to read card and/or store identifiers from an RFID (radio-frequency identification) tag embedded in the card.

In some embodiments, one or more of steps 312-320 may be optional and/or may be omitted. For example, in the cases in which the presence of the user in a particular store is known or automatically detected, selected reward offers may be automatically loaded onto a loyalty card associated with that store without prompting the user to specify the applicable store or card. In some embodiments, a loyalty card may be specified prior to a selection of reward offers, i.e., steps 318-320 may occur before steps 308-310. In some embodiments, for example in which no loyalty card corresponding to a store identifier associated with the selection is associated with the account of the user, entry of a new loyalty card at steps 314-316 may be required and/or automatically requested. At step 322 of process 300, selected reward offers are loaded onto a specified or applicable loyalty card. For example, reward offers may be loaded onto a loyalty card via an API between the rewards service and a loyalty card system, for example wherein the rewards service calls the loyalty card system via the API. In some embodiments, a reward offer is loaded onto a loyalty card at step 322 as a digital or electronic coupon comprising an offer identifier but having no or nominal monetary value, e.g., having a value of $0.

Process 324 of FIG. 3C may be employed for reporting redeemed reward offers to a rewards service, such as rewards service server 102 of FIG. 1 or rewards service 202 of FIG. 2. In some embodiments, process 324 is employed by an entity or system associated with processing loyalty card offers during transactions such as processing system 208 of FIG. 2. In various embodiments, such a system may be associated with a third party, the rewards service, or a store/retailer at which a transaction occurs. Process 324 starts at step 325 at which indications of one or more offers having been loaded onto a loyalty card are received. The loading of offers on a card may be stored in a database of the entity associated with processing loyalty card offers. At step 326, an indication of a utilization of a loyalty card with respect to a purchase transaction is received. Such an indication may be received, for example, in response to the loyalty card being scanned, swiped, or otherwise detected (e.g., by reading an RFID tag embedded in the loyalty card) by an associated system at a point of sale in conjunction with a purchase. At step 328, based on the items and/or services purchased, applicable offers available with respect to the loyalty card are applied to the purchase transaction. For example, the amounts associated with applicable electronic coupons may be credited from the final balance. The final balance is not affected by reward offers comprising electronic coupons for $0, but redemptions of such reward offers may be indicated on a receipt so that a user is aware of the reward offers earned from that purchase transaction. At step 330, redeemed reward offers are reported to the rewards service.

Process 332 of FIG. 3D may be employed to translate redeemed reward offers into reward points. At step 334, a report of redeemed reward offers is received. Such a report may be received, for example, from an entity associated with processing loyalty card offers during transactions. In some embodiments, a report may be generated at step 330 and received at step 334 for each purchase transaction. In some embodiments, an aggregate report including data for one or more different loyalty cards, offers, stores, and/or transactions, for example, over a prescribed period of time (e.g., a day), is generated at step 330 and received at step 334. In some embodiments, the report comprises a batch file indicating loyalty card identifier(s) and redeemed offer identifier (s). For example, data may be presented in the report via a data structure such as data structure 404 of FIG. 4C, which includes fields for a card identifier and an offer identifier. At step 336, a lookup is performed to map a redeemed offer identifier into an applicable number of reward points, e.g., using data structure 400 of FIG. 4A, for example, by looking up a record containing data in data structure 400 using the offer identifier as a key and determining the corresponding reward amount. The reward points determined as step 336 are subsequently credited to an account of a corresponding user at step 338. A lookup may be performed to map a loyalty card identifier associated with a redeemed offer to a user identifier, e.g., using data structure 402 of FIG. 4B, for example, with the card identifier as a key and determining the corresponding user identifier, so that the correct user account is rewarded points at step 338. Moreover, the reward provider (e.g., an associated brand and/or retail partner) is billed for the reward points provided to the user at step 338. In some embodiments, a portion of the billed amount is retained by the rewards service as a service fee. In such embodiments, the billed amount may comprise both the reward points provided to users and the service fee. At step 340, reward points earned for a particular transaction and/or cumulatively are reported to a user. The user may redeem available reward points for various types of rewards as described above.

In some embodiments, a phone number may be employed to identify a user and provide appropriate rewards. For example, the card identifier field of data structure 402 may comprise a user phone number, or data structure 402 may include an additional field for the user phone number. In some such cases, the phone number may be used as a loyalty card identifier or may be used at an entity providing loyalty card processing as a key for looking up a corresponding loyalty card identifier. In some embodiments, for a matching card identifier (e.g., a phone number available in the rewards service system), an entire associated purchase transaction is reported to the rewards service, which considers the items and/or services purchased and identifies and applies applicable offers based on the phone number of the user that conducted the transaction. The user, for instance, is provided rewards for the purchases of items and/or services whose reward offers were previously presented to and viewed by the user, e.g., via a rewards service application at the user mobile device. In such cases, instead of a data structure such as data structure 404 of FIG. 4C, the user phone number (or other identifier uniquely identifying the user) and a list of all items and/or services purchased during a transaction at a prescribed store are reported to the rewards service system from the point of sale so that the appropriate rewards points can be determined and credited to an associated user account.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
storing with respect to a user account of a user information corresponding to a plurality of loyalty cards of the user that are associated with a plurality of stores;
automatically determining that the user is currently present at a prescribed store;
presenting to the user a reward offer available at the prescribed store via a mobile device of the user;
in response to the user viewing the presented reward offer, using a processor to automatically select a loyalty card of the user associated with the prescribed store and load the reward offer to the selected loyalty card by providing electronic couponing data associated with the reward offer and a loyalty identifier of the selected loyalty card to an electronic couponing system that processes loyalty cards at a point of sale at the prescribed store, wherein the loyalty card associated with the prescribed store is automatically selected from the plurality of loyalty cards associated with the user account and the reward offer is automatically loaded to the selected loyalty card of the user in response to user presence at the prescribed store and viewing of the presented reward offer and prior to user utilization of the loyalty card associated with the prescribed store at the prescribed store;
receiving from the electronic couponing system an indication that the loyalty identifier was associated with a transaction in which an item associated with the reward offer was purchased; and
providing a reward amount associated with the reward offer to the user after receiving from the electronic couponing system the indication that the transaction occurred.

2. The method of claim 1, wherein the reward offer is at least in part based on the preferences of the user.

3. The method of claim 1, wherein the reward offer is integrated with an existing loyalty program of the prescribed store via the loyalty card associated with the prescribed store.

4. The method of claim 1, wherein information in the user account corresponding to the plurality of loyalty cards of the user is specified by the user.

5. The method of claim 1, wherein the indication includes the loyalty identifier and an offer identifier corresponding to the reward offer.

6. The method of claim 1, wherein the reward offer is provided by the prescribed store or a brand of the item.

7. The method of claim 1, wherein the loyalty identifier is automatically determined.

8. The method of claim 1, further comprising notifying the user of the provided reward amount.

9. The method of claim 8, wherein the notification is made via SMS.

10. The method of claim 8, wherein the notification is made via a push notification.

11. The method of claim 1, wherein the loyalty identifier comprises a loyalty card number.

12. The method of claim 1, wherein the loyalty identifier comprises a phone number.

13. A system, comprising:
a processor configured to:
store with respect to a user account of a user information corresponding to a plurality of loyalty cards of the user that are associated with a plurality of stores;
automatically determine that the user is currently present at a prescribed store;
present to the user a reward offer available at the prescribed store via a mobile device of the user;
in response to the user viewing the presented reward offer, automatically select a loyalty card of the user associated with the prescribed store and load the reward offer to the selected loyalty card by providing electronic couponing data associated with the reward offer and a loyalty identifier of the selected loyalty card to an electronic couponing system that processes loyalty cards at a point of sale at the prescribed store, wherein the loyalty card associated with the prescribed store is automatically selected from the plurality of loyalty cards associated with the user account and the reward offer is automatically loaded to the selected loyalty card of the user in response to user presence at the prescribed store and viewing of the presented reward offer and prior to user utilization of the loyalty card associated with the prescribed store at the prescribed store;
receive from the electronic couponing system an indication that the loyalty identifier was associated with a transaction in which an item associated with the reward offer was purchased; and
provide a reward amount associated with the reward offer to the user after receiving from the electronic couponing system the indication that the transaction occurred; and
a memory coupled to the processor and configured to provide the processor with instructions.

14. The system of claim 13, wherein the reward offer is integrated with an existing loyalty program of the prescribed store via the loyalty card associated with the prescribed store.

15. The system of claim 13, wherein information in the user account corresponding to the plurality of loyalty cards of the user is specified by the user.

16. The system of claim 13, wherein the loyalty identifier comprises a loyalty card number.

17. The system of claim 13, wherein the loyalty identifier comprises a phone number.

18. A computer program product embodied in a non-transitory computer readable storage medium and comprising computer instructions for:
storing with respect to a user account of a user information corresponding to a plurality of loyalty cards of the user that are associated with a plurality of stores;
automatically determining that the user is currently present at a prescribed store;
presenting to the user a reward offer available at the prescribed store via a mobile device of the user;
in response to the user viewing the presented reward offer, automatically selecting a loyalty card of the user associated with the prescribed store and loading the reward offer to the selected loyalty card by providing electronic couponing data associated with the reward offer and a loyalty identifier of the selected loyalty card to an electronic couponing system that processes loyalty cards at a point of sale at the prescribed store, wherein the loyalty card associated with the prescribed store is automatically selected from the plurality of loyalty cards associated with the user account and the reward offer is automatically loaded to the selected loyalty card of the user in response to user presence at the prescribed store and viewing of the presented reward offer and prior to user utilization of the loyalty card associated with the prescribed store at the prescribed store;
receiving from the electronic couponing system an indication that the loyalty identifier was associated with a transaction in which an item associated with the reward offer was purchased; and
providing a reward amount associated with the reward offer to the user after receiving from the electronic couponing system the indication that the transaction occurred.

19. The computer program product of claim 18, wherein the reward offer is integrated with an existing loyalty program of the prescribed store via the loyalty card associated with the prescribed store.

20. The computer program product of claim 18, wherein information in the user account corresponding to the plurality of loyalty cards of the user is specified by the user.

21. The computer program product of claim 18, wherein the loyalty identifier comprises a loyalty card number.

22. The computer program product of claim 18, wherein the loyalty identifier comprises a phone number.

23. The system of claim 13, wherein the reward offer is at least in part based on the preferences of the user.

24. The system of claim 13, wherein the indication includes the loyalty identifier and an offer identifier corresponding to the reward offer.

25. The system of claim 13, wherein the reward offer is provided by the prescribed store or a brand of the item.

26. The system of claim 13, wherein the loyalty identifier is automatically determined.

27. The system of claim 13, wherein the processor is further configured to notify the user of the provided reward amount.

28. The system of claim 27, wherein the notification is made via SMS.

29. The system of claim 27, wherein the notification is made via a push notification.

30. The computer program product of claim 18, wherein the reward offer is at least in part based on the preferences of the user.

31. The computer program product of claim 18, wherein the indication includes the loyalty identifier and an offer identifier corresponding to the reward offer.

32. The computer program product of claim 18, wherein the reward offer is provided by the prescribed store or a brand of the item.

33. The computer program product of claim 18, wherein the loyalty identifier is automatically determined.

34. The computer program product of claim 18, further comprising computer instructions for notifying the user of the provided reward amount.

35. The computer program product of claim 34, wherein the notification is made via SMS.

36. The computer program product of claim 34, wherein the notification is made via a push notification.

\* \* \* \* \*